United States Patent
Aldi

[15] 3,693,910
[45] Sept. 26, 1972

[54] AIRCRAFT ROTOR BLADE MECHANISM

[72] Inventor: Angelo J. Aldi, 190 Brook Lane, Cheshire, Conn. 06410

[22] Filed: Dec. 14, 1970

[21] Appl. No.: 97,508

[52] U.S. Cl. ...................................244/7 A
[51] Int. Cl. ..................................B64c 27/22
[58] Field of Search ........244/2, 7 R, 7 A, 17, 23, 65, 244/39

[56] References Cited

UNITED STATES PATENTS

| | | | |
|---|---|---|---|
| 3,207,457 | 9/1965 | Kisovec | 244/7 A |
| 3,410,506 | 11/1968 | Hayes | 244/7 A |
| 2,837,301 | 6/1958 | Jenney | 244/7 R |
| 2,984,255 | 5/1961 | Katzenberger | 244/7 R X |
| 3,119,577 | 1/1964 | Andrews | 244/7 R |
| 3,096,041 | 7/1963 | Cheeseman et al. | 244/7 R |

*Primary Examiner*—Milton Buchler
*Assistant Examiner*—Carl A. Rutledge
*Attorney*—Prutzman, Hayes, Kalb & Chilton

[57] ABSTRACT

A STOL aircraft having a fixed wing and a rotor blade mechanism with a rotor support mounted on the aircraft fuselage for pivotal movement about a laterally extending axis, a pair of laterally spaced upwardly extending and laterally outwardly inclined rotor drive shafts mounted on the pivotal rotor support, and single bladed rotors mounted on the drive shafts for rotation in opposite angular directions in noninterfering synchronism. The rotor drive shafts comprise telescoping shaft portions for shifting the rotors between an extended operating position overhead the aircraft fuselage and a retracted stowed position received within longitudinally extending pockets in the fuselage.

12 Claims, 4 Drawing Figures

INVENTOR
ANGELO J. ALDI

BY Prutzman, Hayes, Kalb and Chilton
ATTORNEYS 3,693,910

AIRCRAFT ROTOR BLADE MECHANISM

BRIEF SUMMARY OF THE INVENTION

The present invention relates to an aircraft rotor blade mechanism having notable application in STOL aircraft for providing additional lift during take-off and landing operations.

It is a principal aim of the present invention to provide a new and improved rotor blade mechanism for fixed wing STOL aircraft selectively useable during take-off and landing operations and having rotating blades which may be stowed during flight.

It is another aim of the present invention to provide a new and improved rotor blade mechanism for fixed wing STOL aircraft controllable for maintaining optimum aircraft attitude.

It is a further aim of the present invention to provide a new and improved aircraft rotor blade mechanism which may be maintained in a stowed condition during normal flight operations and which may be selectively employed in an emergency for assisting in landing the aircraft.

It is another aim of the present invention to provide a new and improved rotor blade mechanism of the type having a pair of counter rotating blades.

It is another aim of the present invention to provide a new and improved fixed wing aircraft rotor blade mechanism which may be maintained in a stowed condition during conventional flight operations and selectively operated during flight for example for providing additional lift during slow flight operations.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 1:
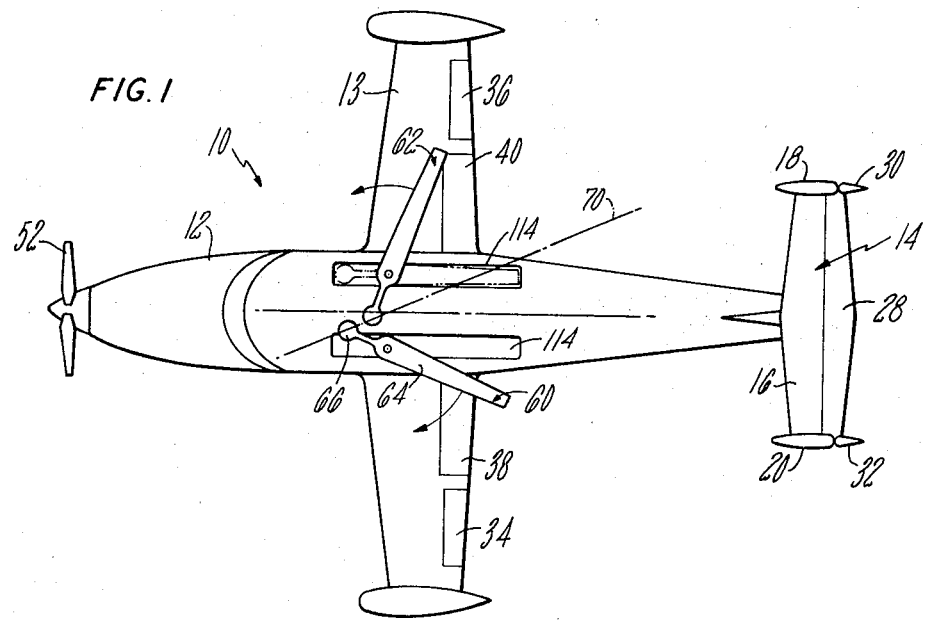
FIG. 1 is a top plan view of a STOL airplane incorporating an embodiment of the present invention.
Figure 2:
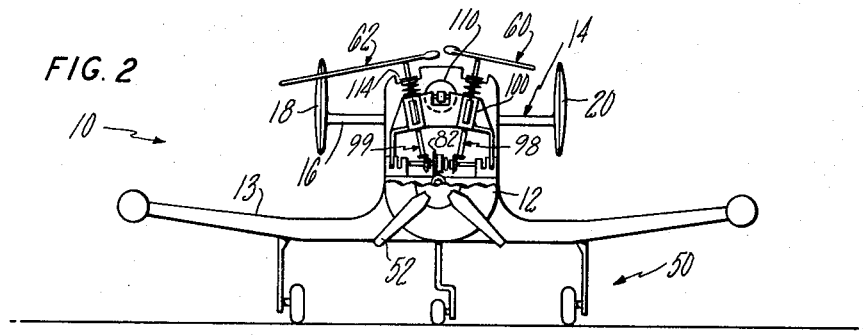
FIG. 2 is a front elevation view, partly broken away and partly in section, of the airplane.

Referring now to the drawings in detail wherein like numerals represent like parts throughout the several figures, an airplane 10 incorporating an embodiment of the present invention is shown comprising an elongated fuselage 12, a fixed low wing 13 and a rear empennage 14 having a horizontal stabilizer 16 and a pair of spaced vertical stabilizers 18, 20. Elevator 28, rudders 30, 32 and ailerons 34, 36 are provided for maneuvering the aircraft in a conventional manner and flaps 38, 40 are provided for increasing the wing lift during landing and take-off and also if desired, during other slow flight operations. The aircraft preferably has retractible tricycle type landing gear 50 and a constant speed variable pitch propeller 52. The propeller 52 is driven by a power plant 54 (which may be a jet engine or reciprocating engine as desired) through suitable gearing 56 and a longitudinally extending drive shaft 58.

A pair of substantially identical single bladed rotors 60, 62 are mounted for rotation overhead the fuselage about laterally spaced and upwardly extending and laterally outwardly inclined axes. Each bladed rotor 60, 62 comprises a single elongated airfoil or blade 64 extending radially from the rotor axis and a diametrically opposed counterweight 66 for balancing the rotor. The blades 64 are mounted for rotation in nonparallel angularly offset planes to prevent interference between the blades, and the blades are connected to rotate together at the same angular velocity and in opposite angular directions in noninterfering synchronism. More particularly, the rotor 62 rotates in the counterclockwise direction as viewed in FIG. 1 and the rotor 60 rotates in the clockwise direction as viewed in FIG. 1, and the operative angular relationship of the rotors 60, 62 provides for the blades 64 to cross along an axis 70 which is angularly offset approximately 22 1 1/2° from the longitudinal axis of the aircraft.

The rotors 60, 62 are driven by the aircraft power plant 54 via drive shaft 58, input bevel gearing 80, 82, an overrunning clutch 88, a laterally extending intermediate drive shaft 89, output bevel gearing 90, 92 and 94, 96 and rotor drive shafts 98, 99. A shaft support 100 is provided for rotatably supporting the drive shafts 98, 99 and is pivotally mounted coaxially with the laterally extending intermediate shaft 89 for pivoting the rotors 60, 62 through a limited angle (e.g., 20° forwardly and 10° rearwardly from an axis normal to the longitudinal axis of the fuselage) for varying the angular relationship between the rotors and the fuselage. A suitable hydraulic actuator 110 connected between the shaft support 100 and aircraft frame is provided for controlling the inclination of the rotors.

The fuselage 12 has a pair of parallel longitudinally extending pockets or recesses 114 for storing the rotors 60, 62 and the rotors are adapted to be axially shifted between an extended operating position shown in full lines in the drawings and a retracted stowed position in the fuselage pockets 114 shown in part in broken lines in FIG. 1. For this purpose each rotor shaft 98, 99 comprises a pair of telescoping shaft portions 116, 118, and a pair of hydraulic actuators 120 are connected to the outer shaft portion 118 via a rotary collar 122 for axially shifting the rotors 60, 62.

The shaft portions 116, 118 have a generally helical spline connection 124 which provides a driving connection between the shaft portions 116, 118 and for angularly shifting the rotors 60, 62 as they are axially shifted between their stowed parallel relationship and their extended operative relationship providing for the rotor blades 64 to cross along the offset axis 70. The helical spline connections 124 are preferably designed to retract the declutched blades from a generally rearwardly extending nonrotating stable position thereof established by the aircraft air stream when the airplane is cruising at a predetermined speed, for example, approximately 20 to 30 knots above stall speed.

A compression spring 130 mounted between the shaft support 100 and a nonrotating collar 132 bearing against the collar 122 provides for assisting the hydraulic actuators 120 to extend the rotors 60, 62 and also for emergency extension of the rotors if the normal extension system fails. Also, each bladed rotor 60, 62 is pivotally mounted for varying the pitch of the rotor blade 64 and a hydraulic actuator 140 connected between the collar 122 and rotor blade 64 is shown provided for setting the blade pitch.

Figure 4:
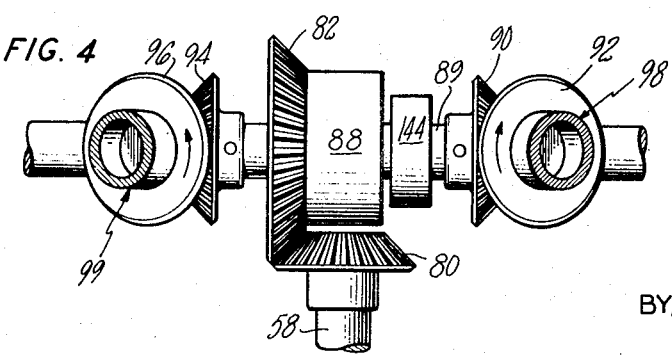
FIG. 4 is an enlarged partial plan view, partly broken away and partly in section, showing a portion of a rotor drive train of the propulsion system.

Referring to FIG. 4, the overrunning clutch 88 is provided for selectively disengaging the drive to the intermediate shaft 89 and for permitting the rotors 60, 62 to autorotate in an emergency. A brake 144 is provided for braking the intermediate shaft 89 and for locking the intermediate shaft 89 in a predetermined angular position which provides for positioning the rotors 60, 62 for being retracted to their stowed positions.

ROTOR MECHANISM OPERATION

Figure 3:
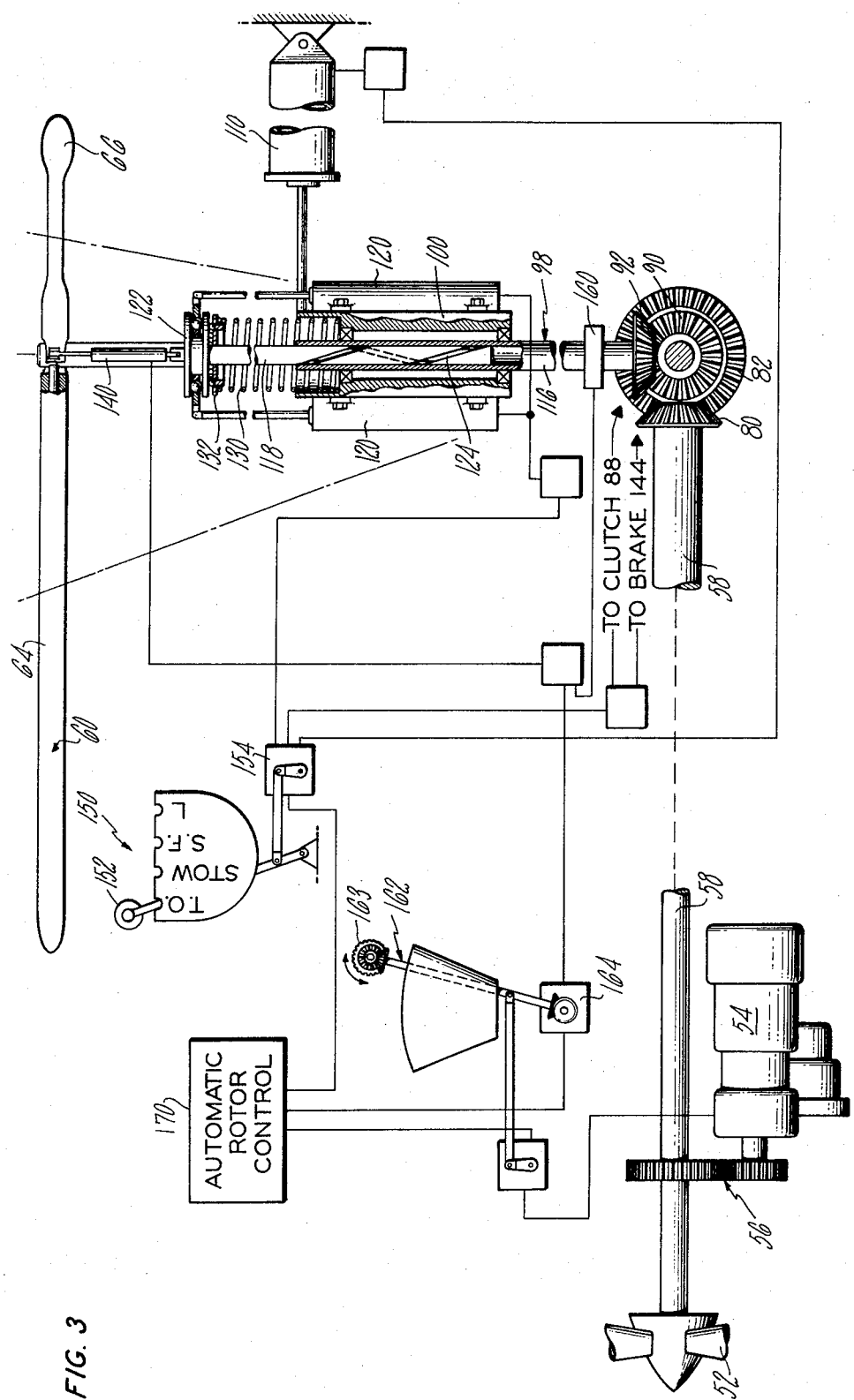
FIG. 3 is a generally schematic representation, partly broken away and partly in section, of the propulsion system of the aircraft.

Referring to FIG. 3, a rotor mode selector 150 located in the aircraft cockpit comprises a selector lever 152 operable by the aircraft pilot for selectively conditioning the rotor mechanism for take-off, slow flight, and landing operations and stowing the rotor blades in the pockets 114 of the fuselage. The manual selector lever 152 is connected to operate a suitable controller 154 which in turn operates the axial position hydraulic actuators 120, pivotal position hydraulic actuator 110, clutch 88 and brake 144, in the proper sequence as necessary to condition the rotor mechanism in accordance with the setting of the manual selector. Thus, for example, when extending the rotors 60, 62 from their stowed positions, the hydraulic actuators 120 are initially operated to extend the rotors 60, 62 while the hydraulic actuator 110 maintains the rotor axis in its neutral or upright position shown in FIG. 3. After the rotors 60, 62 are fully extended, the brake 144 is released and the clutch 88 is engaged to rotate the rotors 60, 62 and the pivotal position hydraulic actuator 110 is operated to pivot the support 100 in accordance with the setting of the manual selector. In this regard the support 100 is preferably inclined forwardly during take-off and slightly rearwardly during landing and is positioned approximately at a neutral position during slow flight operation. A speed sensor 160 provides for controlling the blade pitch actuator 140 for maintaining the blade flat while the rotors 60, 62 are below a predetermined minimum speed.

A throttle 162 is provided in a conventional manner for operating the power plant 54 and also has an additional rotatable handle 163 for operating a pitch controller 164 for controlling the blade pitch of the rotor blades 64. For short field take-offs and landings, the rotor blades are rotated to maximum pitch to provide maximum vertical lift. Also, an automatic rotor control 170 is employed for automatically controlling the operation of the rotor mechanism in accordance with the manual selection of the manual selector 150. The automatic rotor control 170 would preferably have inputs of the flight status of the aircraft including inputs of the air density, angle of attack, and air speed, and would be programmed to provide for automatic operation of the rotor mechanism including automatic extension and retraction of the rotors and continuous control of the rotor inclination and blade pitch to obtain optimum results in accordance with the flight status of the aircraft.

As will be apparent to persons skilled in the art, various modifications, adaptations and variations of the foregoing specific disclosure can be made without departing from the teachings of the present invention.

I claim:

1. In an aircraft having an elongated fuselage and a rotor blade mechanism mounted on the fuselage having overhead counter rotating bladed rotors for providing lift, the improvement wherein the rotor blade mechanism comprises a rotor support mounted on the fuselage for pivotal movement about a laterally extending axis, a pair of laterally spaced rotor shafts mounted on the rotor support for rotation about upwardly and laterally outwardly extending axes, substantially identical bladed rotors fixed onto the rotor shafts respectively for rotation overhead the fuselage, means interconnecting the rotor shafts for rotation of the bladed rotors together in noninterfering synchronism in opposite angular directions, actuator means operable for pivoting the support about said laterally extending axis, and control means for controlling the operation of the actuator means for pivotally controlling the rotor support and for thereby controlling the angular relationship of the fuselage and rotors.

2. In an aircraft according to claim 1 wherein each bladed rotor comprises a single elongated blade extending generally radially from the rotor axis.

3. In an aircraft according to claim 2 wherein the fuselage has a pair of pockets extending generally longitudinally rearwardly of the rotor shafts respectively for receiving the elongated blades and wherein the rotor blade mechanism comprises means for axially shifting the bladed rotors between an extended operating position rotatable overhead the fuselage and a retracted storage position in the longitudinally extending fuselage pockets.

4. In an aircraft according to claim 3 wherein each rotor shaft comprises a pair of telescoping shaft portions relatively axially shiftable for axially shifting the respective bladed rotor between its extended and retracted positions.

5. In an aircraft having an elongated fuselage and a rotor blade mechanism mounted on the fuselage having overhead counter rotating bladed rotors for providing lift, the improvement wherein the rotor blade mechanism comprises a rotor support mounted on the fuselage for pivotal movement about a laterally extending axis, a pair of laterally spaced rotor shafts mounted on the rotor support for rotation about upwardly and laterally outwardly extending axes, substantially identical bladed rotors fixed onto the rotor shafts respectively for rotation overhead the fuselage, means interconnecting the rotor shafts for rotation of the bladed rotors together in noninterfering synchronism in opposite angular directions, and control means for pivotally controlling the rotor support for controlling the angular relationship of the fuselage and rotors, each bladed rotor comprising a single elongated blade extending generally radially from the rotor axis, the fuselage having a pair of pockets extending generally longitudinally rearwardly of the rotor shafts respectively for receiving the elongated blades, the rotor blade mechanism comprising means for axially shifting the bladed rotors between an extended operating position rotatable overhead the fuselage and a retracted storage position in the longitudinally extending fuselage pockets, the axial shifting means comprising angular shifting means for angularly shifting at least one of the rotors for positioning the rotors in generally parallel relationship in the retracted positions in the fuselage pockets and for positioning the rotors in a different operative angular relationship in their extended positions for rotation in opposite angular directions in noninterfering synchronism.

6. In an aircraft according to claim 3 wherein the aircraft comprises a fixed wing and forward propulsion means and a cockpit for an aircraft pilot for manipulating the aircraft and wherein the axial shifting means comprises selector means operable from the cockpit by the pilot during flight for shifting the rotors from their retracted to their extended positions.

7. In an aircraft according to claim 6 wherein the selector means is operable from the cockpit by the pilot during flight for shifting the rotors from their extended to their retracted positions whereby the aircraft may be selectively operated for either fixed wing operation alone or compound fixed and rotary wing operation.

8. In an aircraft according to claim 7 further comprising drive means selectively engageable for rotating the bladed rotors in opposite angular directions, and wherein the selector means is operable for selectively engaging the drive means for rotation of the rotors in their extended operating positions and disengaging the rotors for permitting retraction of the rotors to their stored positions.

9. In an aircraft according to claim 1 wherein the bladed rotors are pivotally mounted for varying the blade pitch thereof and wherein the rotor control means is operable for pivoting the bladed rotors for establishing the blade pitch.

10. In an aircraft having an elongated fuselage, and a rotor blade mechanism mounted on the fuselage having overhead bladed rotor means, the improvement wherein the rotor blade mechanism comprises a rotor support mounted on the fuselage for pivotal movement about a laterally extending axis, upwardly extending shaft means mounted on the support for being pivoted with the support about said laterally extending axis, bladed rotor means mounted on the shaft means overhead the fuselage for providing lift, drive means for driving the bladed rotor means, actuator means operable for pivoting the support about said laterally extending axis, and control means for controlling the operation of the actuator means for pivotally setting the rotor support and for thereby setting the angular relationship between the fuselage and bladed rotor means.

11. In an aircraft according to claim 10 wherein the bladed rotor means comprises at least one elongated rotor blade, wherein the fuselage has generally longitudinally extending pocket means for receiving each elongated rotor blade and wherein the rotor blade mechanism comprises means for axially shifting each rotor blade along its axis of rotation between an extended operating position rotatable overhead the fuselage and a retracted storage position received within the longitudinally extending fuselage pocket means.

12. In an aircraft having an elongated fuselage, a fixed laterally extending wing, forward propulsion means, and a rotor blade mechanism mounted on the fuselage having overhead counter rotating bladed rotors for providing lift, the improvement wherein the rotor blade mechanism comprises a pair of laterally spaced upwardly extending rotor shafts mounted on the fuselage, elongated blades mounted on the rotor shafts for rotation overhead the fuselage, the fuselage having generally longitudinally extending pocket means for receiving the elongated blades, and means for axially shifting the elongated rotor blades between extended operating positions overhead the fuselage and retracted storage positions in the longitudinally extending fuselage pocket means, the axial shifting means comprising angular shifting means for angularly shifting at least one of the rotors for positioning the rotors in generally parallel relationship in the retracted positions in the fuselage pocket means and for positioning the rotors in a different operative angular relationship in their extended positions for rotation in opposite angular directions in noninterfering synchronism.

* * * * *